(12) United States Patent
Sessa

(10) Patent No.: US 7,939,633 B2
(45) Date of Patent: May 10, 2011

(54) DECOLORIZATION/DEODORIZATION OF CORN ZEIN PRODUCTS

(75) Inventor: David J. Sessa, Dunlap, IL (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 749 days.

(21) Appl. No.: 11/728,700

(22) Filed: Mar. 27, 2007

(65) Prior Publication Data

US 2008/0242842 A1 Oct. 2, 2008

(51) Int. Cl.
*A23J 1/00* (2006.01)
*A61K 36/899* (2006.01)

(52) U.S. Cl. ........ 530/373; 530/412; 530/415; 423/700; 502/60

(58) Field of Classification Search .............. 530/373, 530/412, 415; 423/700; 502/60
See application file for complete search history.

(56) References Cited

U.S. PATENT DOCUMENTS

| | | | | |
|---|---|---|---|---|
| 2,105,760 A | * | 1/1938 | Swallen | 530/373 |
| 2,120,946 A | * | 6/1938 | Swallen | 530/373 |
| 2,229,870 A | * | 1/1941 | Pearce | 530/373 |
| 2,272,488 A | * | 2/1942 | Swallen | 530/373 |
| 3,676,365 A | * | 7/1972 | Shirai et al. | 502/424 |
| 5,254,673 A | * | 10/1993 | Cook et al. | 530/373 |
| 5,342,923 A | * | 8/1994 | Takahashi et al. | 530/373 |
| 5,367,055 A | | 11/1994 | Takahashi | |
| 5,510,463 A | * | 4/1996 | Takahashi et al. | 530/373 |
| 6,610,831 B1 | | 8/2003 | McInnis et al. | |
| 2006/0045860 A1 | * | 3/2006 | Gupta | 424/67 |

FOREIGN PATENT DOCUMENTS

GB 651396 * 4/1951

OTHER PUBLICATIONS

Mumpton (Proc Natl Acad Sci 96, 3463-3470, 1999).*
Sessa, David J., "Improved Methods for Decolorization Corn Zein", Industrial Crops and Products, 18, 2003, pp. 55-65.

* cited by examiner

*Primary Examiner* — David Lukton
(74) *Attorney, Agent, or Firm* — Randall E. Deck; John Fado; Lesley Shaw

(57) ABSTRACT

Decolorized and/or deodorized zein from corn products may be recovered in high yields using zeolite adsorbents. A solution of a zein-containing corn product in an aqueous alcohol solvent is contacted with a zeolite adsorbent under conditions effective for adsorption of color and odor impurities in the corn product onto the zeolite. Following this contact, the treated solution may be separated from the adsorbent and recovered, yielding substantially pure zein dissolved in the aqueous alcohol solvent. Optionally, the zein may be further purified by subsequently contacting the treated solution with an activated carbon adsorbent or a mixture of activated carbon and zeolite adsorbents to adsorb any residual color and/or odor impurities therefrom.

34 Claims, No Drawings

DECOLORIZATION/DEODORIZATION OF CORN ZEIN PRODUCTS

BACKGROUND OF THE INVENTION

1. Field of the Invention

The invention is drawn to a method for decolorizing and/or deodorizing zein from corn products.

2. Description of the Prior Art

Zein is a protein by-product of corn processing which has many industrial uses and which can be incorporated into numerous commercial products, including paints and inks, coatings for food products, tableted medicaments, paper and paper products, microencapsulating agents, adhesives in laminated wood products, and bases for chewing gums. Zein exhibits adhesive properties and is soluble in aqueous alcohols and alkaline solutions, and may be used in the preparation of films and fibers. Films may be readily formed by spraying, dipping or otherwise coating the outer surface of objects with a solution of zein and drying. Such films have excellent resistance to water, acids, and heat, and also possesses electric insulation properties.

A variety of processes have been described for recovering and purifying zein from corn products, including extraction with aqueous alcohols, hydrocarbons or other organic solvents. However, the zein extracted by these processes, when dried, is characterized by an inherent yellow color and odor. These characteristics have deterred its use in some applications, particularly those in the food and medical industries. The yellow color of corn and zein has been attributed to the carotenoids β-carotene, zeaxanthin, and lutein (Quackenbush et al., 1961, J. Agric. Food Chem. 9:132-135; Blessin, 1962, Cereal Chem. 39:326-242; and Kurilich and Juvick, 1999, J. Agric. Food Chem. 47:1948-1955)

A number of authors have described processes for removing the impurities responsible for yellow coloration of zein (Mason and Palmer, 1934, J. Biol. Chem. 107:131-132; Swallen, 1938, U.S. Pat. No. 2,120,946; Pearce, 1941, U.S. Pat. No. 2,229,870; and Starling et al., 1951, GB patent specification no. 651,396). Of these, Starling et al. described decolorizing zein by contact of a zein solution with adsorbents selected from various activated carbons, activated alumina, Fuller's Earth, kieselguhr, bentonite, diatomaceous silica, and precipitated chalk, followed by treatment with a bleaching agent. More recently, Takahashi et al. (U.S. Pat. No. 5,367,055) described a process for removing color from zein by extraction with acetone, while McInnis et al. (U.S. Pat. No. 6,610,831) described a process for removing color from zein by extraction of flaked corn with ethanol followed by contact with an activated carbon adsorbent. None of these processes have addressed the removal of odor from zein products.

Therefore, despite these advances, the need remains for devising an improved process for recovering decolorized and deodorized zein product, that includes not only a zein product which is decolorized and deodorized while in solid phase, but which is also colorless in solution.

SUMMARY OF THE INVENTION

I have now discovered an improved method for recovering decolorized and/or deodorized zein from corn products. I have unexpectedly discovered that zeolite adsorbents preferentially bind the color and odor components associated with yellow corn zein without significantly binding the zein, thereby allowing its recovery in high yields. Moreover, in addition to binding impurities such as the xanthophylls: lutein, and zeaxanthin, which contribute to the yellow color of zein dispersions, the zeolites also preferentially bind and remove diferuloylputrescine, which contributes to the off-odor of zein solids. Thus, the process yields not only substantially colorless and odorless solid zein, but also substantially colorless solutions of zein in aqueous alcohols.

In the process of this invention, a crude solution of a zein-containing corn product in an aqueous alcohol solvent is contacted with a zeolite adsorbent under conditions effective for adsorption of the color and odor impurities in the corn product onto the zeolite. Following this contact, the treated solution may be separated from the adsorbent and recovered, yielding substantially pure zein dissolved in the aqueous alcohol solvent. Optionally, the zein may be further purified by subsequently contacting the treated solution with an activated carbon adsorbent or a mixture of activated carbon and zeolite adsorbents to adsorb any residual color and/or odor impurities therefrom. The process can be conducted using batch, semi-continuous, or continuous systems.

In accordance with this discovery, it is an object of this invention to provide a method for recovering pure or substantially pure zein from corn products in high yields.

Another object of this invention is to provide a method for recovering pure or substantially pure zein from corn products in high yields while removing color and odor causing impurities.

A further object of this invention is to provide a method for removing color and odor causing impurities from the zein of corn products wherein the degree of purity of the zein may be adjustably controlled.

Yet another object of this invention is to provide for recovering pure or substantially pure zein from corn products which is colorless not only while in a solid phase, but which is also colorless when dissolved in an aqueous alcohol solvent.

A still further object of this invention is to provide for recovering pure or substantially pure zein from corn products without the use of hydrocarbon or toxic solvents.

Other objects and advantages of this invention will become readily apparent from the ensuing description.

DETAILED DESCRIPTION OF THE INVENTION

The preferred starting material for the process may be any zein-containing corn product or partially purified yellow corn zein dissolved in an aqueous alcohol solvent. It is understood that this zein solution may also contain a variety of dispersed solids including those described in greater detail hereinbelow. Owing to the solubility of the zein in alcohols, the solution may be readily prepared by mixing the zein-containing corn product in any aqueous alcohol solvent under conditions effective to dissolve the zein therein and disperse any other solids.

A variety of zein-containing corn products are suitable for use herein, and include, but are not limited corn, dry-milled corn, corn gluten meal, dried distillers grains, defatted corn gluten meal, and combinations thereof. However, in accordance with a preferred embodiment and depending on the starting material, the zein-containing corn product may be first treated to remove starches and other polysaccharides. Notably, the presence of lipids and other proteins does not negatively effect the process. Removal of at least a portion of the starches and polysaccharides is preferred particularly when the contact of the zein-containing solution with the zeolite is conducted in a packed column, where the presence of substantial levels of starches and polysaccharides, particularly above about 15% combined, by weight, may lead to fouling of the columns if these components separate out.

Removal of starches, polysaccharides, and other corn solids may be effected using conventional techniques, such as described by McInnis et al. (U.S. Pat. No. 6,610,831) or Cheryan (U.S. Pat. No. 6,433,146). Briefly, in a preferred embodiment the starches, polysaccharides, and other residual solids are removed by aqueous ethanol extraction followed by separation of the ethanol solution by screening, filtering, centrifugation, or combinations thereof. The aqueous ethanol solution containing the dissolved zein may then be utilized as described herein, while the separated starch and polysaccharides may be utilized for ethanol production, and other solids such as the gluten fraction may be used as animal feed.

Dissolution of the zein may be effected in a number of aqueous alcohol solvents, although monohydric alcoholic solvents such as ethanol, propanol, isopropanol, methanol, and combinations thereof, are preferred, with aqueous ethanol being particularly preferred. The alcohol concentration in the aqueous solvent should be between about 60 to about 95%, by weight, with a concentration of about 65% being particularly preferred. Zein has a tendency to aggregate and eventually agglomerate to form highly viscous dispersions in aqueous alcohol when allowed to stand for extended periods. Thus, to avoid fouling problems and ensure proper exposure to and entrapment of the impurities on the zeolite adsorbent, particularly when using packed columns, the alcoholic zein solution should preferably be contacted with the zeolite adsorbent within 24 hours of the completion of the solubilization of the zein. The concentration of the crude zein in the aqueous alcohol solution may vary as long as the zein is solubilized. Without being limited thereto, alcohol solutions wherein the solids content of the crude zein varies between about 2-8%, by weight, are preferred, with a crude zein solids content of about 6 to about 6.5% being particularly preferred. Solutions with crude zein solids contents greater than about 8% may exhibit aggregation and reduce both decolorization/deodorization efficiency and zein yields.

Zeolite are hydrated aluminum silicates of the general types $Na_2O.xAl_2O_3.ySiO_2.yH_2O$, $K_2O.xAl_2O_3.ySiO_2.yH_2O$ or $CaO.xAl_2O_3.ySiO_2.yH_2O$. The particular zeolite adsorbent used is not critical, and a variety of zeolites are suitable for use herein, including zeolite A, zeolite B, natural zeolites, synthetic zeolites (i.e., molecular sieves), and combinations thereof. Moreover, the zeolite may be a sodium, potassium or a calcium zeolite. However, the pore size of the adsorbent is governed by the salt ion composition, and potassium ions typically yield the smallest pore size, followed by sodium ions yielding an intermediate pore size and calcium ions yielding somewhat larger pores. I have found that zeolites of the A type are preferred, with calcium zeolites being particularly preferred. The pore size of the adsorbent does impact the efficiency of the binding of impurities, and zeolite adsorbents having a mean pore size less than 10 Å are preferred, more preferably less than or equal to about 5 Å, and most preferably equal to about 5 Å. Although the particle size of the adsorbent does not directly effect binding of impurities, columns filled with very small sized adsorbent particles are susceptible to significant pressure drops and reduced flow rates of the feed stream therethrough. Thus, in the process of the invention, adsorbents having a mean particle size sufficiently large as to be retained on an approximately 30 mesh screen and substantially free of particles significantly less than about 30 mesh, are preferred.

The optional activated carbon adsorbent used for further purification of the zein may also be obtained from a variety of sources. However, activated carbon is typically a non-specific adsorbent that not only binds the color impurities associated with zein but also the protein itself, and thereby may diminish the recovery of the zein. When activated carbon is used as a column chromatography medium, usually both the color components as well as protein are adsorbed, mainly by a molecular sieving action where the lower molecular weight species (i.e., diferuloylputrescine as well as the xanthophylls) become entrapped within the pore structure of the activated carbon medium by either electrostatic attraction and/or chemical bonding. In contrast, the larger molecular weight zein protein accumulates onto the orifice of larger pore structure and remains at the surface of the activated carbon most likely bound by hydrophobic/hydrophobic bonding attributed by the carbonaceous surface. By selecting the pore size of the activated carbon, the adsorption of the zein may be minimized without a significant reduction in the adsorption of the impurities. Thus, I have found that use of activated carbons with a mean pore radius of 10 angstroms or less are much more effective for adsorbing the color/odor components of yellow zein and only limited amounts of protein, thereby allowing the recovery of the zein in higher yields. A particularly preferred activated carbon for this process is that prepared from coconut hulls. Although activated carbons such as those prepared from coal, wood, and cellulosic residues may be used herein, these tend to bind higher amounts of protein. As with the zeolite adsorbent, activated carbon adsorbents having a mean particle size sufficiently large as to be retained on an approximately 30 mesh screen are preferred.

Contact of the zein solution with the zeolite adsorbent and the optional activated carbon/zeolite adsorbent mixture, may be effected using any conventional solid/liquid contactors, including but not limited to packed bed columns or chromatography columns, stirred tanks or simulated moving beds. The operation may be conducted as a batch, semi-continuous or continuous system. In a preferred embodiment, the zein solution is contacted with the zeolite adsorbent (and the subsequent, optional activated carbon/zeolite adsorbent mix) by directing the flow of the solution substantially upwardly through the adsorbent, such as in an anti-gravity column. Directing the flow upward in this fashion limits the pressure drop caused by any undissolved solids in the zein solutions. In another preferred embodiment, the process utilizes multiple columns for treatment of the solution with the zeolite adsorbent. In one such particularly preferred multi-column system, the columns may be equipped with an automated switching system to allow countercurrent flow using the simulated moving bed principle. In this system, the points of feed and eluate introduction and product withdrawal may be switched periodically to simulate countercurrent movement of the adsorbent. By varying the ratio between product fractions it is possible to build up an internal component inventory (a sample of purified zein solutions from multiple recycling operations) inside the system. Only fractions of the purified zein solutions are removed as products where the rest of the components keep recirculating inside a closed loop.

Conditions, especially temperature, for the zeolite adsorption, and particularly the activated carbon/zeolite adsorption, may significantly impact the efficacy of the decolorization/deodorization and the yields of the zein. The adsorption capacity of the zeolites and particularly the activated carbons for the color/odor impurities can be accentuated by heating the zein solutions. Although temperatures of about 25° C. to about 65° C. are suitable for use herein, activated carbon adsorbance for the color/odor components but not the protein components can be greatly accentuated at a temperature of about 55° C., and is therefor particularly preferred.

Following its adsorption on the zeolite media, the treated solution of the now substantially pure zein (which may also be referred to as the eluate, permeate or filtrate, depending on the mode of contact) may be recovered from the adsorbent media for subsequent use or it may be further treated for additional removal of any residual color and odor impurities. For instance, if the level of purity is determined to be acceptable, the aqueous alcohol solvent in the recovered solution may be removed to substantial dryness to yield substantially pure, solid phase zein suitable for storage and/or transport. The alcohol solvent may be removed by conventional techniques such as evaporation, drum drying, spray drying, vacuum distillation, dialysis, membrane separation under pressure (e.g., reverse osmosis or ultrafiltration.

If further decolorization and/or deodorization of the zein is desired, the treated zein solution or permeate may be recycled through contact with the same or fresh zeolite adsorbent in the same or different vessel. Of course, when using multi-column systems, the level of purity may also be adjusted by altering the number of columns employed. However, in an optional, yet particularly preferred embodiment, I have discovered that the removal of residual color and/or odor impurities can be greatly enhanced by further contacting the substantially pure zein solution recovered from the zeolite adsorption, with an activated carbon adsorbent in a second, downstream vessel, especially when the activated carbon is mixed with a zeolite adsorbent. Enhanced removal of color and odor impurities, and increased yields of zein, are effected by use of activated carbon/zeolite mixtures wherein the ratio, by weight, of zeolite to activated carbon is about 1:1 or higher, preferably about 4:1. Suitable and preferred activated carbons, as well as the treatment conditions, are described above.

In accordance with another preferred embodiment, the purity of the zein may be monitored, and the recycle or further treatment of the treated solution controlled, by spectrophotometric analysis of the treated zein solution or permeate. This embodiment allows for the consistent recovery of zein having a predetermined level of purity, color, and odor (a predetermined concentration of color and odor impurities). Quantitative monitoring of the purity of the zein is predicated on my discovery that the odor impurity diferuloylputrescine, is characterized by an apparent UV absorbance at 325 nm while zein may be characterized by an apparent UV absorbance at 280 nm, where removal of diferuloylputrescine which absorbs at 325 nm coincides with the removal of color causing impurities xanthophylls, both of which bind to the zein protein. Thus, the detection of absorbance at 280 nm is correlated to or is indicative of the presence of zein and the detection of absorbance at 325 nm is correlated to or indicative of the presence of the impurity diferuloylputrescine, and the ratio of the absorbance at these two wavelengths can provide a ready indication of the level of purity of the zein solution recovered from the adsorption. In this embodiment, the UV absorbance of the substantially pure zein solution such as in the column eluate, is measured at about 280 nm ($A^1$) and about 325 nm ($A^2$), respectively, and the ratio of $A^1$ to $A^2$ (or its inverse) is calculated. This measured value may then be compared to a predetermined threshold ratio of $A^1$ to $A^2$ (or its inverse) which threshold represents the predetermined maximum allowable concentration of diferuloylputrescine relative to zein in the substantially pure zein solution (i.e., is indicative of the presence of unacceptably high levels of the impurity). If the ratio of $A^1$ to $A^2$ is less than the threshold value (or if the inverse is greater than the inverse of the threshold), then the treated zein solution or column eluates may be recycled through contact with the same or fresh zeolite adsorbent in the same or different vessel until a satisfactory measurement is achieved. These threshold values may be readily determined by routine testing using samples of known concentrations. However, as a practical matter, a preferred threshold ratio of $A^1$ to $A^2$ is about 5, with a threshold ratio of $A^1$ to $A^2$ equal to about 10 being particularly preferred.

The following example is intended only to further illustrate the invention and is not intended to limit the scope of the invention which is defined by the claims.

Example 1

A batch process system was developed. Solutions of partially purified zein of varying degrees of purity, color and odor were dissolved in aqueous ethanol and subjected to column chromatography on only one or two columns. Recycling the column eluates proved to effectively clarify, decolorize and deodorize the zein solutions. Recycled samples from the solvent pool were monitored for UV absorbance at wavelengths 280 nm and 325 nm and when the ratio of those two wavelengths was about 10:1 the recycling mode was stopped after which time alcohol solvent was partially removed on a Roto-Vap evaporator, and the resulting stripped sample was dialyzed against water. Precipitated materials were freeze dried.

A laboratory scale system consisted of two columns connected in series where elution of a 6% zein solids dispersed in 65% aqueous ethanol was pumped with a peristaltic pump at a rate of 15 ml/hour through two packed columns one of which had bed dimensions 2.5 cm diameter by 80 cm in height and the other hooked in series was 2.5 cm diameter by 24 cm in height. Column adsorbent media were either the native zeolite, clinoptilolite, having a mean pore size of 5 Å and a mean particle diameter of 0.55 to 0.65 mm, or synthetic zeolite molecular sieve 8 to 12 mesh beads with a mean 5 Å pore size. These media gave equivalent results. Column breakthrough volume of solvent front was 240 ml; eluate collection was made after passage of this solvent volume where eluates were then recycled into the dispersed zein solvent pool with total volume of 400 ml. The pump rate was limited by the size of tubing equipped with the peristaltic pump used. The eluate was pumped anti-gravity so as not to compress media bed by particulate matter in the original turbid zein dispersion. Five column volume cycles proved adequate for obtaining a clarified zein product with ratio about 8:1 when eluates from the recycled pool were analyzed by UV spectrophotometer. At that ratio of 8:1 a slight degree of visible yellow color was still evident. If the shorter final column was packed with zeolite molecular sieve mixed with an activated carbon medium in a weight ratio not greater than 1:1, the pooled recycled eluates were totally clear and colorless. The pooled eluates possessed UV ratio of 280 nm to 325 nm greater than 10:1.

An upscaled laboratory system consisted of a column bed with dimensions 2.6" diameter and 7.2" in height with ½" inlet and outlet, and a pressure of 5 psi from a compressed air operated Wilden pump achieved a flow rate of about 1 liter/hour where a gallon amount of 6% zein solids in 65% aqueous ethanol could be processed by recycling in about 7½ hours to achieve the desired degree of decolorization/deodorization.

It is understood that the foregoing detailed description is given merely by way of illustration and that modifications and variations may be made therein without departing from the spirit and scope of the invention.

I claim:

1. A method for decolorizing and/or deodorizing zein from corn products comprising:
    a) providing a solution of a zein-containing corn product in an aqueous alcohol solvent;
    b) contacting said solution with a zeolite adsorbent within a first vessel under conditions effective for adsorption of color and odor impurities in said zein-containing corn product onto said zeolite; and c) separating said zeolite adsorbent from said solution to yield a substantially pure zein solution;
wherein said decolorizing and/or deodorizing method is effective to remove at least one impurity selected from the group consisting of lutein, zeaxanthin and diferuloylputresine.

2. The method of claim 1 further comprising contacting said substantially pure zein solution with an activated carbon adsorbent under conditions effective for further adsorption of color and odor impurities in said substantially pure zein solution onto said activated carbon.

3. The method of claim 2 wherein said activated carbon adsorbent is in admixture with a zeolite adsorbent, and said color and odor impurities in said substantially pure zein solution are adsorbed onto both of said activated carbon and said zeolite.

4. The method of claim 3 wherein the ratio, by weight, of zeolite to activated carbon in said admixture is about 1:1 or higher.

5. The method of claim 4 wherein said ratio, by weight, of zeolite to activated carbon in said admixture is about 4:1.

6. The method of claim 2 wherein said activated carbon comprises a mean pore size of about 10 Å or less.

7. The method of claim 2 wherein said activated carbon comprises a particle size sufficient to be retained on an approximately 30 mesh screen.

8. The method of claim 2 wherein said activated carbon is derived from plant material selected from the group consisting of coconut hulls.

9. The method of claim 1 further comprising:
a) measuring the UV absorbance, $A^1$ and $A^2$, of said substantially pure zein solution at about 280 nm and about 325 nm, respectively, wherein zein is characterized by an apparent UV absorbance at 280 nm and the odoriferous impurity diferuloylputrescine, is characterized by an apparent UV absorbance at 325 nm, and determining a first ratio of said $A^1$ to $A^2$ or its inverse;
b) selecting a threshold ratio of $A^1$ to $A^2$ or its inverse which represents the maximum allowable concentration of said diferuloylputrescine relative to zein in said substantially pure zein solution;
c) comparing said first ratio or its inverse with said threshold or its inverse; and
d) further contacting said substantially pure zein solution with a zeolite adsorbent if said first ratio less than said threshold ratio, or if the inverse of said first ratio is greater than the inverse of said threshold ratio.

10. The method of claim 9 wherein said threshold ratio is about 5.

11. The method of claim 9 wherein said threshold ratio is about 10.

12. The method of claim 9 wherein said further contacting said substantially pure zein solution with a zeolite adsorbent comprises recycling through said zeolite in said first vessel, contacting with zeolite adsorbent contained in one or more additional vessels, or both.

13. The method of claim 1 wherein said zeolite adsorbent is selected from the group consisting of a zeolite A, a zeolite B, a natural zeolite, a synthetic zeolite, and combinations thereof.

14. The method of claim 13 wherein said zeolite adsorbent is selected from the group consisting of a sodium zeolite, a potassium zeolite, and a calcium zeolite, and combinations thereof.

15. The method of claim 13 wherein said zeolite adsorbent comprises a hydrated aluminum calcium silicate.

16. The method of claim 13 wherein said zeolite adsorbent comprises a particle size sufficient to be retained on an approximately 30 mesh screen.

17. The method of claim 13 wherein said zeolite adsorbent comprises a mean pore size less than 10 Å.

18. The method of claim 17 wherein said zeolite adsorbent comprises a mean pore size equal to about 5 Å.

19. The method of claim 1 wherein said providing comprises mixing a crude zein-containing corn product in said aqueous alcohol solvent under conditions effective to dissolve said zein therein.

20. The method of claim 19 wherein said contacting said solution with a zeolite adsorbent is conducted within 24 hours of the completion of said mixing.

21. The method of claim 20 further comprising separating residual solids after said mixing to yield said solution.

22. The method of claim 1 wherein said corn product in said solution has a combined starch and polysaccharide content of about 15% or less, by weight.

23. The method of claim 1 wherein said corn product is selected from the group consisting of corn, dry-milled corn, corn gluten meal, dried distillers grains, defatted corn gluten meal, and combinations thereof.

24. The method of claim 1 wherein said aqueous alcohol solvent comprises a monohydric alcohol selected from the group consisting of ethanol, propanol, isopropanol, methanol, and combinations thereof.

25. The method of claim 1 wherein the alcohol concentration in said solvent is between about 60 to about 95%, by weight.

26. The method of claim 1 wherein the solids content of said zein in said solution of a zein-containing corn product is between about 2-8% by weight.

27. The method of claim 1 wherein the temperature during said contacting said solution with said zeolite adsorbent is between about 25° C. to about 65° C.

28. The method of claim 27 wherein said temperature is about 55° C.

29. The method of claim 1 wherein said contacting said solution with a zeolite adsorbent comprises directing the flow of said solution substantially upwardly through said zeolite adsorbent.

30. The method of claim 1 wherein said contacting said solution with a zeolite adsorbent is conducted in more than one of said vessels.

31. The method of claim 30 wherein said vessels comprise columns packed with said zeolite adsorbent arranged in countercurrent flow of said solution.

32. The method of claim 1 wherein said contacting is conducted in a batch, semi-continuous or continuous system.

33. The method of claim 1 wherein said color and odor impurities at least one impurity comprises diferuloylputresine.

34. A method for decolorizing and/or deodorizing zein from corn products comprising:
a) providing a solution of a zein-containing corn product in an aqueous alcohol solvent;
b) contacting said solution with a zeolite adsorbent within a first vessel under conditions effective for adsorption of color and odor impurities in said zein-containing corn product onto said zeolite;
c) separating said zeolite adsorbent from said solution to yield a substantially pure zein solution;
d) measuring the UV absorbance, $A^1$ and $A^2$, of said substantially pure zein solution at about 280 nm and about 325 nm, respectively, wherein zein is characterized by an apparent UV absorbance at 280 nm and the odoriferous impurity diferuloylputrescine, is characterized by an apparent UV absorbance at 325 nm, and determining a first ratio of said $A^1$ to $A^2$ or its inverse;

e) selecting a threshold ratio of $A^1$ to $A^2$ or its inverse which represents the maximum allowable concentration of said diferuloylputrescine relative to zein in said substantially pure zein solution;

f) comparing said first ratio or its inverse with said threshold or its inverse; and g) further contacting said substantially pure zein solution with a zeolite adsorbent if said first ratio less than said threshold ratio, or if the inverse of said first ratio is greater than the inverse of said threshold ratio;

wherein said threshold ratio is about 5.

* * * * *